United States Patent [19]

Haury et al.

[11] Patent Number: 4,721,321

[45] Date of Patent: Jan. 26, 1988

[54] WHEELCHAIR WITH ADJUSTABLE REAR CANES

[75] Inventors: Gilbert E. Haury, Grafton; Nathalal G. Patel; Walter G. Lockard, both of Elyria; Thomas R. Wiatrak, Brunswick; Neal J. Curran, Fairview Park, all of Ohio

[73] Assignee: Invacare Corporation, Elyria, Ohio

[21] Appl. No.: 837,743

[22] Filed: Mar. 10, 1986

Related U.S. Application Data

[60] Division of Ser. No. 548,370, Nov. 3, 1983, Pat. No. 4,595,212, Continuation-in-part of Ser. No. 442,037, Nov. 16, 1982, Pat. No. 4,500,102.

[51] Int. Cl.⁴ .............................................. B62M 1/14

[52] U.S. Cl. ................................ 280/242 WC; 285/4; 297/183; 297/374; 297/DIG. 4

[58] Field of Search ............... 280/242 WC, 289 WC; 297/DIG. 4, 19, 34, 183, 355, 374, 376; 225/96, 96.5, 103, 104, 105; 285/4; 135/65, 66, 75

[56] References Cited

U.S. PATENT DOCUMENTS

| | | | |
|---|---|---|---|
| 913,366 | 2/1909 | Donnelly | 285/4 |
| 986,905 | 3/1911 | Carlson | 285/4 |
| 1,710,821 | 4/1929 | Hackney | 297/DIG. 4 X |
| 3,138,400 | 6/1964 | Reid | 297/19 |
| 3,666,292 | 5/1972 | Bartos | 280/242 WC X |
| 3,758,150 | 9/1973 | Williams | 297/DIG. 4 X |
| 3,784,252 | 1/1974 | Peterson | 297/355 X |
| 4,273,350 | 6/1981 | Williams | 297/DIG. 4 X |
| 4,360,213 | 11/1982 | Rudwick et al. | 280/242 WC |
| 4,592,570 | 6/1986 | Nassiri | 280/289 WC X |

FOREIGN PATENT DOCUMENTS

| | | | |
|---|---|---|---|
| 3331472 | 3/1985 | Fed. Rep. of Germany | 297/355 |

*Primary Examiner*—John J. Love

*Assistant Examiner*—Charles R. Watts

*Attorney, Agent, or Firm*—Fay, Sharpe, Beall, Fagan, Minnich & McKee

[57] ABSTRACT

The sports wheelchair includes a frame portion (A) having left and right side frame portions. Rear wheel assemblies (B) are connected with the left and right side frame portions such that the rear wheels are connectable to the frame in any one of a plurality of positions and with an adjustable camber. A pair of front wheel assemblies (C) selectively interconnect front wheels with the frame with any one of a plurality of adjustable height, inward-outward, and forward-aft positions. An operator supporting seat (D) having a segmented center portion and an outer portion is selectively interconnected with the left and right side frame portions. A folding mechanism (E) enables the left and right side frame portions to be folded together for easier transportation and storage.

8 Claims, 21 Drawing Figures

WHEELCHAIR WITH ADJUSTABLE REAR CANES

BACKGROUND OF THE INVENTION

This application is a divisional of application Ser. No. 548,370, filed Nov. 3, 1983, now U.S. Pat. No. 4,595,212, which in turn is a continuation-in-part of application Ser. No. 442,037, entitled Sports Wheelchair, filed Nov. 16, 1982, now U.S. Pat. No. 4,500,102.

The present invention relates to personal mobility apparatus, such as wheelchairs. It finds particular application in conjunction with wheelchairs for sporting and athletic activities and will be described with particular reference thereto. It is to be appreciated, however, that the invention is applicable to daily use as well as other specialized uses.

Heretofore, wheelchairs have primarily been designed to provide transportation, often with an emphasis on operator comfort, portability, and the like. Many wheelchair operators demand more than mere transportation. There is a growing interest in athletic activities and sports among wheelchair occupants. The prior art wheelchairs tend to lack the responsiveness, maneuverability, durability, and other characteristics demanded for wheelchair sports and athletic activities.

Many of the wheelchairs being used for athletic and sporting activities are variations and adaptations of the prior art wheelchairs designed for non-sporting uses. Some wheelchair athletes have custom-built their own wheelchairs for sporting and athletic activities, often using parts cannibalized from the prior art wheelchairs. An exemplarly wheelchair which is used for sporting and athletic activities was illustrated in U.S. Pat. No. 4,351,540, issued September, 1982 to J. P. Minnebraker. The Minnebraker wheelchair provided vertical and fore-and-aft adjustments of the rear wheel, fore-and-aft and side-to-side adjustments of a front wheel, and for easy replacement of a operator seat assembly.

Although the Minnebraker wheelchair provided improved adjustability as demanded by the wheelchair athletes, it still had certain drawbacks. First, the chair did not fold to facilitate transportation. Second, the front and rear wheel mounting assemblies provided limited adjustment. Third, the seat assembly was relatively heavy and added weight to the chair.

The present invention contemplates a new and improved sports wheelchair which overcomes the above-referenced problems and others to provide a wheelchair which is ideally suited for sports and athletic activities.

SUMMARY OF THE INVENTION

In accordance with the present invention, there is provided a sports wheelchair which is adapted for sporting and athletic activities as well as for daily use. A operator supporting means is operatively connected with a wheelchair frame assembly. An adjustable rear wheel mounting means selectively mounts each of a pair of rear wheels to the frame assembly in one of a plurality of positions. An adjustable front wheel mounting means selectively mounts each of a pair of front wheels to the frame in one of a plurality of positions.

In accordance with one aspect of the invention, the front and rear wheel mounting means each provide a preselected plurality of discrete height and fore-to-aft adjustment positions.

In accordance with another aspect of the invention, a folding mechanism connects left and right frame portions. In a more limited aspect, the folding mechanism includes four upper spacer members pivotally connected at outer ends with the left and right frame portions and at their inner ends with an upper pivotal connecting means. Four lower spacer members are pivotally connected at outer ends with the left and right frame portions and at inner ends with a lower pivotal connecting means. One of the upper and lower pivotal connecting means includes rotation coordinating means for coordinating movement of the left and right spacer members such that the left and right frame portions are folded symetrically.

In accordance with another aspect of the invention, a removable arm rest and shirt guard is selectively mountable on the left and right frame portions.

In accordance with another aspect of the invention, a spoke guard is connected to the wheels with hook and loop connecting fabric.

In accordance with yet another aspect of the invention, footrest portions are telescopically connected with the frame. The footrest portions each include an open, U-shaped tubular member which is rotatable between a generally horizontal foot supporting position and a generally vertical position to facilitate access to the wheelchair.

In accordance with still another aspect of the invention, the operator supporting means includes a seat back structure for supporting the operator's back. The seat back structure is pivotally connected to the frame by a hinge means and releasably locked generally in a vertical position by a locking means.

A primary advantage of the present invention is that it facilitates custom adjustment to the operator's specifications.

Other advantages of the present invention are that it is lightweight for responsive handling, foldable to facilitate transportation, yet strong and durable to withstand the abuse of rugged athletic contests.

Still further advantages of the present invention will become apparent to others upon reading and understanding the following detailed description of the preferred embodiment.

BRIEF DESCRIPTION OF THE DRAWINGS

The invention may take form in various parts and arrangements of parts. The drawings are only for purposes of illustrating a preferred embodiment of the invention and are not to be construed as limiting it.

DETAILED DESCRIPTION OF THE PREFERRED EMBODIMENTS

Figure 1:
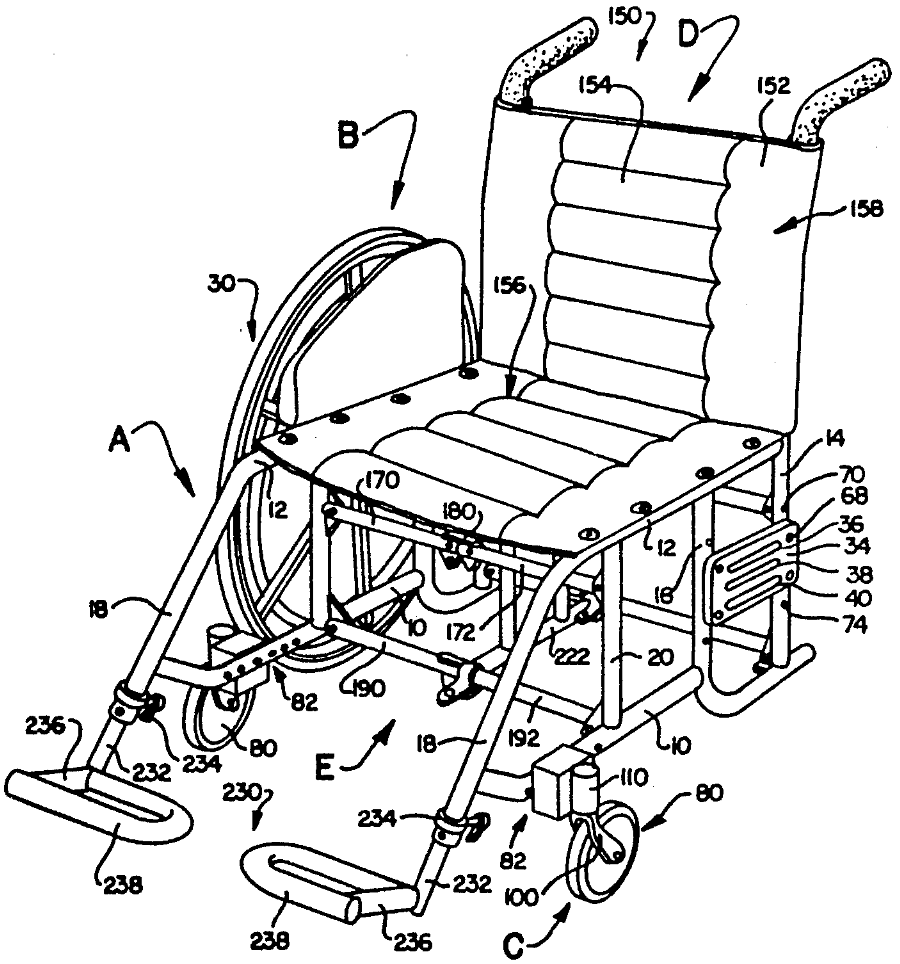
FIG. 1 is a perspective view of a sports wheelchair in accordance with the present invention with the left rear wheel removed for ease of illustration.

With particular reference to FIGS. 1, 11, 13 and 14, the sports wheelchair includes a frame assembly A. The wheelchair is movably supported on the ground or other support surface by an adjustable rear wheel assembly B and an adjustable front wheel assembly C. An operator supporting means D is operatively connected with the frame assembly A for supporting the operator during athletic competitions and the like. A folding mechanism E enables the wheelchair, including the frame assembly and operator supporting assembly, to be folded to a narrow width to facilitate transportation and storage.

It is to be appreciated that the wheelchair is symmetric to the left and right of a central axis. For simplicity of illustration, like parts of the left and right sides of the front-to-rear central axis, e.g. left and right frame portions, are denoted by the same reference numeral.

With reference to FIG. 1, the frame assembly A includes parallel lower horizontal frame portions 10 and upper horizontal frame portions 12. A pair of rear vertical support frame portions 14 and 16 connect the upper and lower horizontal frame portions adjacent the rear wheel assemblies. The rearmost support 14 extends beyond the upper horizontal support frame portion to support the operator's back. A forward support frame portion 18 connects the upper and lower horizontal frame portions adjacent the front. A central support frame portion or brace 20 is connected between the upper and lower horizontal frame portions intermediate the front and rear support frame portions. Taken together, the horizontal and vertical supporting frame portions to the left of a central axis comprise a left side main frame portion and those to the right comprise a right side main frame portion. The folding mechanism E interconnects the left and right side main frame portions. The frame tubing may be stainless steel, aluminum, titanium, or the like. Titanium and titanium alloys are preferred for their high strength to weight ratio.

Figure 3:
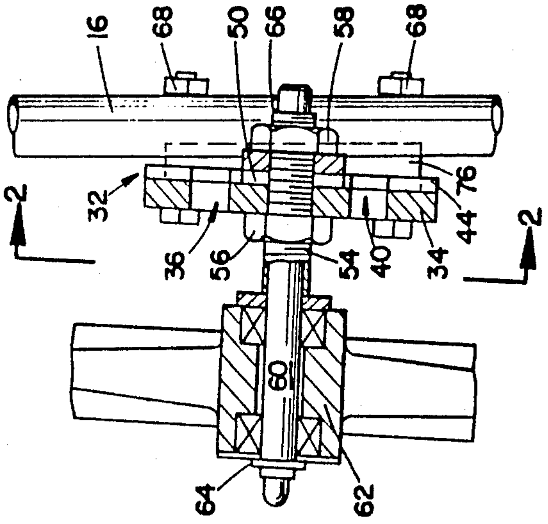
FIG. 3 is a sectional view through section 3—3 of FIG. 2.
Figure 4:
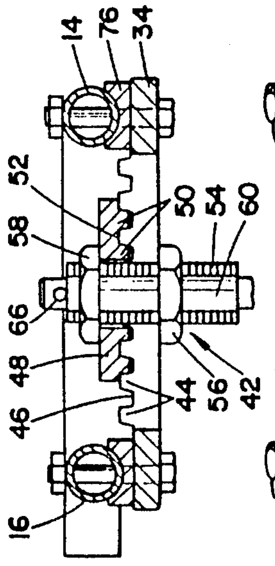
FIG. 4 is a sectional view through section 4—4 of FIG. 2.
Figure 2:
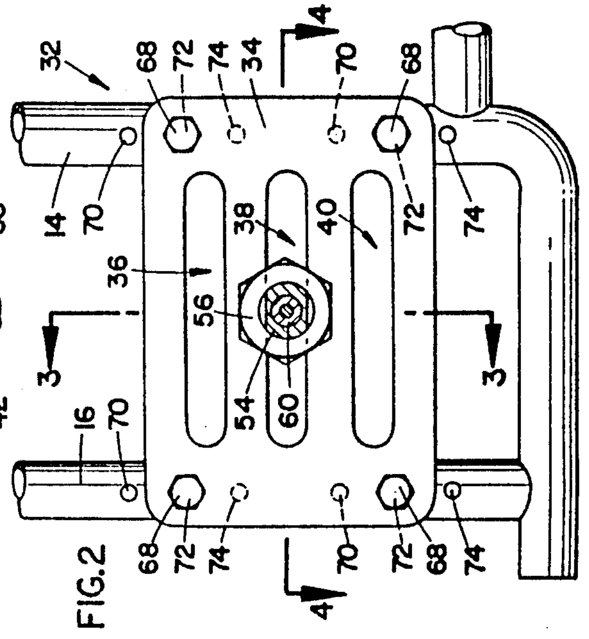
FIG. 2 is an enlarged side view of a rear wheel mounting assembly of FIG. 1.

With continuing reference to FIG. 1, and particular reference to FIGS. 2, 3, and 4, the rear wheel assembly includes a pair of rear wheels 30 which are connected to the frame with adjustable rear wheel mounting means 32. Each of the rear wheel mounting means 32 includes a mounting plate 34 which has a plurality of horizontal slots 36, 38, and 40 which extend on parallel slots axes. In the preferred embodiment, the mounting plate includes three slots. However, for lighter weight, the mounting plate may be vertically shortened to a single slot. An axle receiving assembly 42 is selectively positionable in the slots at a selectable position along each slot. A stop means is provided for stopping movement of the axle receiving assembly along the slot in which it is mounted. In the preferred embodiment, the stop means includes a first or plate stop means which includes a plurality of alternating ridges 44 and valleys 46 extending transverse to the parallel slot axes. The axle receiving assembly 42 includes a second stop means 48 which has like ridges 50 and valleys 52, for selectively engaging the plate ridges and valleys. In the preferred embodiment, the plate including the ridges and valleys is a one piece aluminum extrusion which is cut to length (height) and which has the slots cut therein.

The axle receiving assembly 42 further includes an externally threaded element 54 which is dimensioned for receipt in the mounting plate slots and for sliding receipt of the second means 48. First and second internally threaded members or nuts 56 and 58 are threadedly received on externally threaded member 54 on opposite sides of the mounting plate to mount it rigidly thereto. The nuts 56 and 58 hold the ridges and valleys of the first and second stop means in meshing engagement. The externally threaded member 54 further includes an internal bore for selectively receiving a releasable axle 60. In the preferred embodiment, the axle extends through a hub 62 of the rear wheel and through the externally threaded member. The axle includes a permanent projection 64 at one end and a selectively retractable projection 66 at the other for releasably locking the axle through the hub and bore, hence for releasably securing the rear wheel.

The mounting plate 34 has a plurality of apertures for receiving a plurality of fasteners 68 therethrough. The rear vertical frame members 14 and 16 each include a plurality of sets of apertures 70, 72, and 74 such that the mounting plate is selectively mountable in any one of a corresponding plurality of positions. In this manner, the height of the interconnection between the rear axle and the chair if primarily adjustable by selecting one of the plurality of horizontal slots and is secondarily adjustable by selecting the set of apertures in which the mounting plate is fastened. In this manner, a discrete by closely spaced plurality of vertical rear wheel height adjustments are provided. Optionally, a pair of canting elements 76 may be received between the mounting plate and the vertical frame member such that the mounting plate 34, hence the axle receiving assembly 42 and rear wheel 30, are canted. Alternately, the mounting plate may alternately be positioned with the slots vertically and the alternating ridges and valleys horizontally.

Figure 6:
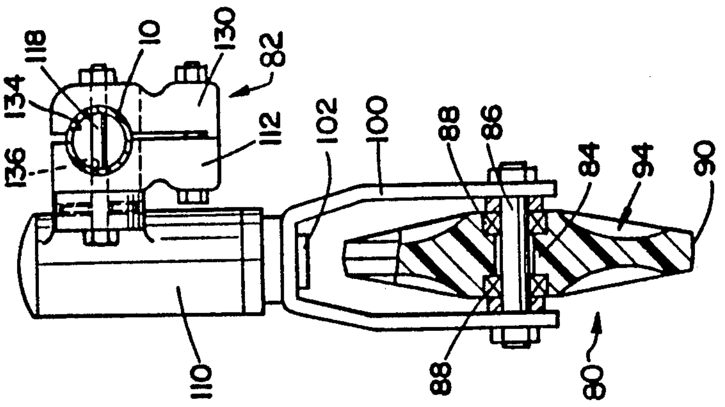
FIG. 6 is a sectional view through section 6—6 of FIG. 5.
Figure 5:
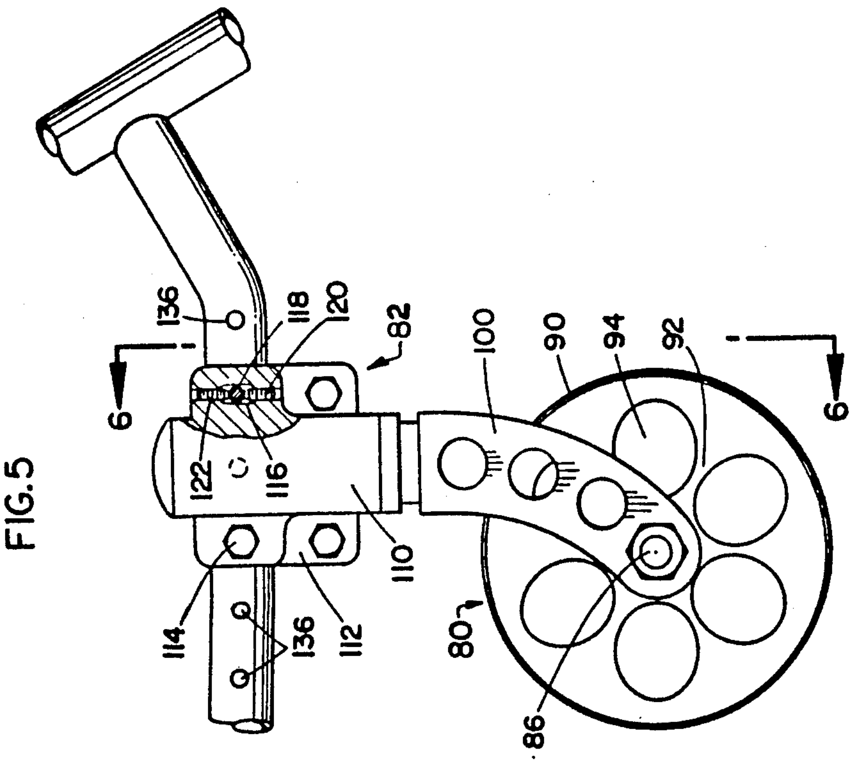
FIG. 5 is an enlarged view in partial section of a front wheel mounting assembly of FIG. 1.
Figure 7:
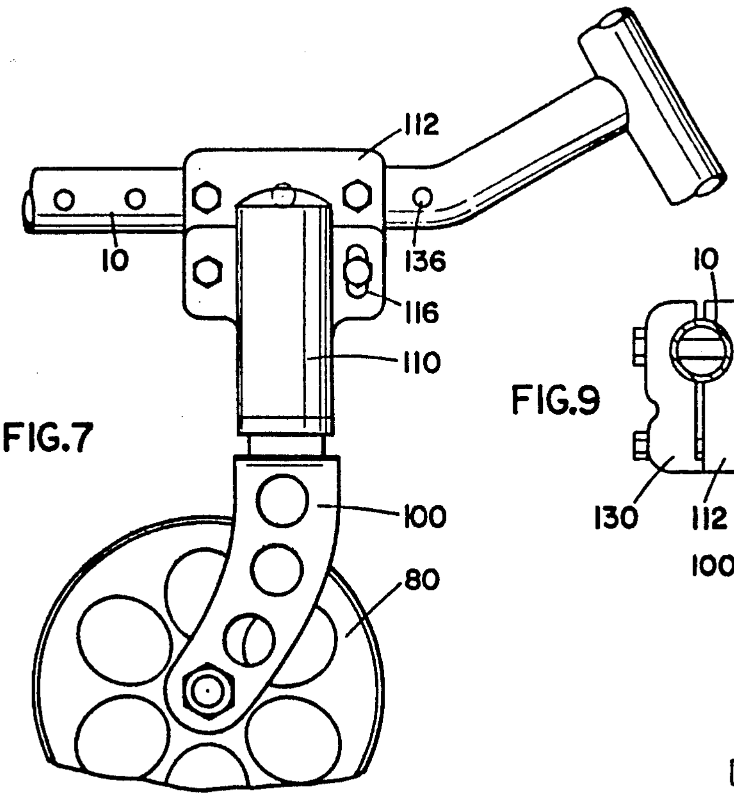
FIG. 7 is a side view of the front wheel mounting assembly analogous to FIG. 5 but with the front wheel mounted to elevate the front of the wheelchair.

With continued reference to FIG. 1, and particular reference to FIGS. 5-9, the front wheel assembly C includes a pair of front wheels 80 and adjustable front wheel mounting means 82 for selectively mounting each of the front wheels to the frame assembly in one of a plurality of positions. With particular reference to FIGS. 5 and 6, each front wheel 80 includes a relatively wide, central portion 84 adjacent an axle 86 for providing a relatively long surface for supporting a bearing means 88. In this manner, the wheel is inhibited from wobbling on the axle. Adjacent a circumferential edge 90, the wheel is relatively narrow to minimize the area which engages the ground or other supporting surface which, in turn, minimizes friction. Between the central and circumferential regions, the front wheels have radially extending alternating wide portions 92 and narrow or scooped out portions 94. This provides strength to support the circumferential portion yet reduces weight.

With continuing reference to FIGS. 5 and 6, the front wheel mounting means 82 has a wheel supporting assembly or fork 100 which mounts the axle 86 at one end and has a vertical cylindrical shaft 102 at its upper end. A wheel fork mounting bracket 110 rotatably receives the cylindrical shaft 102 in a generally vertical orientation so that the front wheel may rotate freely. The bracket 110 is mounted to a mounting block 112 by a first pivot means 114, such as a fastener and aperture, and an arcuate slot 116 and fastener 118. The arcuate slot 116 permits the bracket to be pivoted about the first pivot means 114 such that the cylindrical shaft 102 is vertically disposed regardless of the angle of attack of the wheelchair. An angular adjustment locking means is selectively positionable in the arcuate slot to lock the bracket 110 from pivoting about the pivot means 114. In the preferred embodiment, the locking means includes a first threaded element 120 and a second threaded element 122 which are threadedly disposed through the bracket for selectively foreshortening the effective length of the arcuate slot. Specifically, the threaded elements engage the fastener 118.

In the preferred embodiment, the mounting block 112 and a second mounting block 130 are mounted on the lower horizontal frame portion 10. Each of the mounting blocks has a recess, 132 and 134 respectively, for receiving and frictionally engaging the lower horizontal frame portion 10. Each mounting block has a first pair of apertures and a second pair of apertures. Both pair of apertures have the same horizontal spacing as the pivot means 114 and arcuate slot 116. In this manner, the bracket 110 is thus adapted to be mounted to the mounting blocks through either the first or second pair of apertures. Thus, the bracket is adapted to be mounted in either of two discrete vertical positions as typified by FIGS. 5 and 7.

Figure 8:
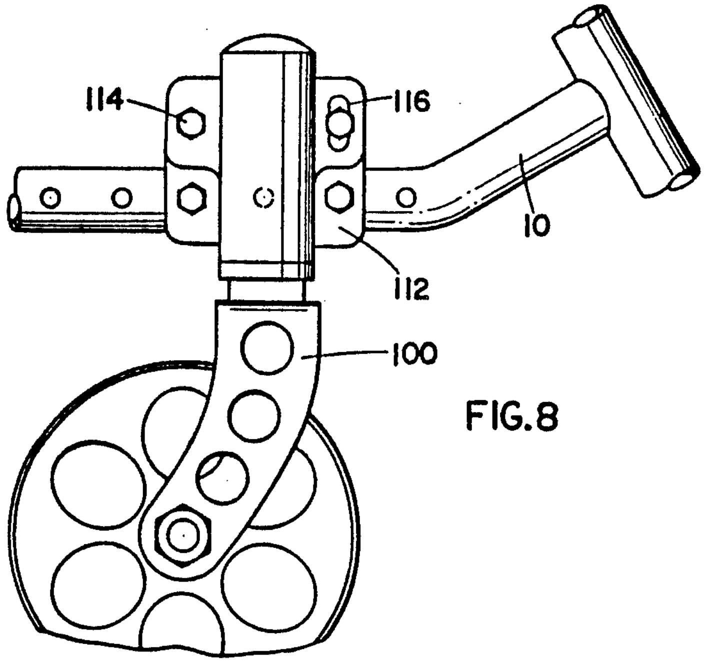
FIG. 8 is a side view of front wheel mounting assembly analogous to FIG. 5 with the front wheel mounted to lower the front end of the wheelchair.

With particular reference to FIG. 8, the mounting blocks 112 and 130 are adapted to be mounted on the lower horizontal frame portion 10 with the recesses 132 and 134 either at the lower end or at the upper end. In this manner, the first and second bracket portions can be reversed about the horizontal axis such that the second aperture pair is disposed above the lower horizontal frame portion. This provides a third height adjustment position for the bracket 110.

Figure 9:
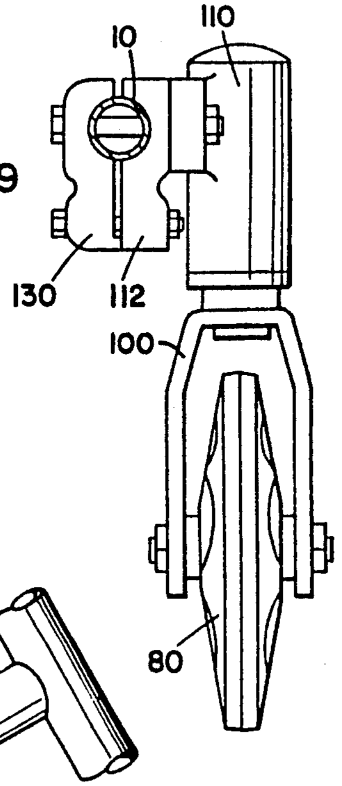
FIG. 9 illustrates the front wheel mounting assembly of FIG. 5 mounted to the inside of the frame.

With reference to FIG. 9, the bracket 110 is further adapted to be mounted on either the inside or the outside of the lower horizontal frame portion 10. In this manner, the swivel structure is adapted to be mounted in six positions. Further, the lower horizontal frame portion has a plurality of pairs of apertures, such as apertures 136 for selective alignment with the mounting block apertures. This enables the mounting blocks, hence the brackets 110 to be selectively positioned at a plurality of forward and aft positions along the lower horizontal frame portion. Optionally, the mounting blocks 112 and 130 may each be shortened to a single pair of apertures. This provides lighter weight but foregoes the height adjustment option.

With continuing reference to FIG. 1, the operator supporting means D includes a flexible cloth seat 150 including side portions 152 and a segmented central portion 154. A front or lower operator supporting portion 156 is secured to the upper horizontal frame portions 12. A back or upper supporting portion 158 is connected with the vertical back support frame members 14. In the preferred embodiment, the flexible seat is constructed of cloth with cushion-filled pockets. Preferably, the side and central seat portions are in team colors.

Figure 10:
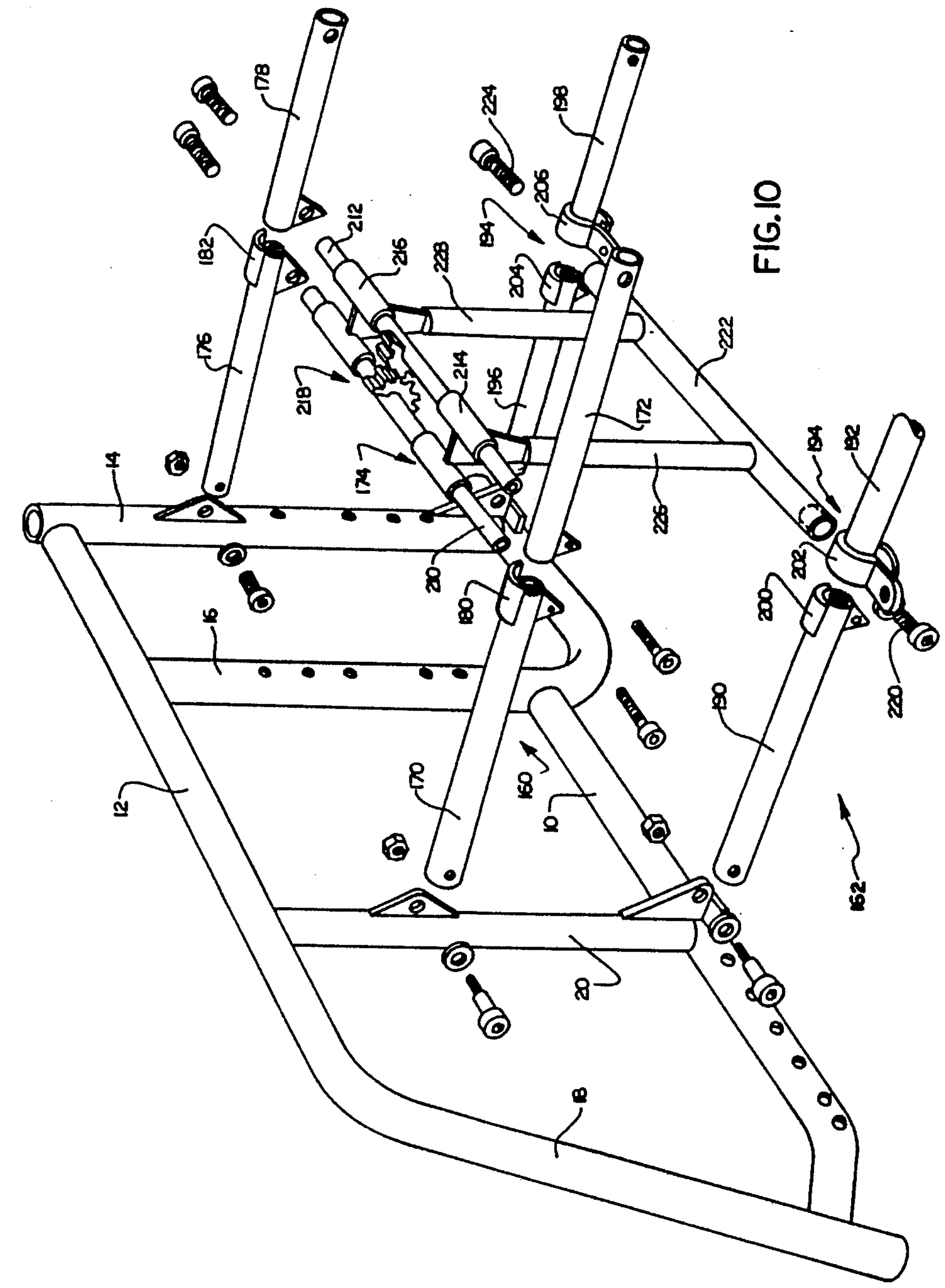
FIG. 10 is an enlarged, exploded view of the folding mechanism of the wheelchair of FIG. 1.

With continuing reference to FIG. 1, and further reference to FIG. 10, the folding mechanism E includes a main frame folding means which selectively enables the left and right frame portions to be moved together into a close parallel relationship for easier transportation and storage. The main frame folding structure includes an upper folding and locking portion 160 and a lower folding and locking portion 162. The upper and lower folding mechanisms are biased by gravity toward an unfolded position.

The upper folding portion 160 includes a pair of upper forward spacing members 170, 172 which are pivotally connected at outer ends with the left and right frame portions and pivotally connected at inner ends with an upper pivotal connection assembly or means 174. In the preferred embodiment, the upper folding portion further includes upper, rear spacing members 176 and 178 which are pivotally connected at their outer ends with the rearmost vertical frame support member 14 and at their inner ends with the upper pivotal connection assembly 174. The pivotal interconnection between the spacing members and the frame and between the spacing members and the pivotal connection means 174 allow the innermost ends of the spacing members to be folded upward, drawing the left and right frame side portions together. Locking or downward limit means 180 and 182 prevent the spacing members from being pivoted downward beyond a generally horizontal orientation. In the preferred embodiment, the locking means 180 and 182 permit the spacing members to move a few degrees below horizontal to create a more stable, unfolded position.

The lower folding mechanism portion 162 includes lower, forward spacing members 190 and 192. The lower forward spacing members are pivotally connected at their outer ends adjacent the interconnection of the central vertical support member 20 and the lower horizontal support member 10, and pivotally connected at their inner ends with a lower pivot connection assembly or means 194. A pair of rear, lower spacer members 196 and 198 are pivotally connected at their outer ends adjacent the rearmost frame member 14 and at their inner ends with the lower pivotal connection means 194. The abutting surfaces of lower locking elements 200, 202 and 204, 206 limit downward pivoting of the lower spacer members.

The upper pivotal connection assembly 174 includes a first shaft 210 which is connected with the inner end of the upper spacer members 170 and 176 which are connected with a common side of the frame. A second shaft 212 is connected with the inner end of the other upper spacer members 172 and 178. The pivot shafts 210 and 212 are rotatably received in a forward bushing assembly 214 and in a rearward bushing assembly 216. The shafts are rigidly and non-rotatably connected with the inner ends of the spacer members such that the shafts rotate in coordination with the pivoting of the spacer members. A rotation coordination means 218 insures that the spacer members to either side of the upper pivot assembly rotate the same number of degrees in coordination with each other. In the preferred embodiment, the rotation coordination means includes a pair of gear segments which intermesh with each other and are each non-rotatably connected with one of pivot shafts 210 and 212.

The lower pivot assembly 194 includes a pivot pin 220 which extends through apertures connected with the inner ends of the lower, forward spacing member 190 and 192 and is received in a central shaft 222. The interconnection between the pivot pin, the forward spacing members, and the shaft 222 is such that the lower spacing members rotate freely relatively to each other and the shaft 222. Analogously, a rearward lower pivot pin 224 pivotally connects the inner ends of the lower, rearward spacing members 196, 198 with each other and the shaft 222. A pair of connecting members 226 and 228 connect the lower shaft 222 with the forward and rearward bushings 214 and 216 such that the upper and lower pivotal connection assemblies 174 and 194 move in coordination with each other. Optionally, both the upper and lower pivot assemblies may have the same construction, either the construction of the upper pivot assembly or the construction of the lower pivot assembly. As yet another option, the folding mechanism may be rotated 90 such that the spacing members move fore and aft in generally horizontal planes.

Referring again to FIG. 1, a footrest assembly 230 is connected telescopically with the forward frame portions 18. Because the left and right footrest assemblies are mirror images of each other, the same reference numerals are used to describe both. Each footrest assembly includes a tubular telescoping member 232 which is telescopically received the forward frame support tube 18 and locked in a selected telescopic relationship therewith by a clamp means 234. An outward extending tubular member 236 is rotatably mounted on an axle member (not shown) which extends generally transverse to the telescopic member 232. An open, U-shaped tubular foot support member 238 is connected at both ends with the tubular member 236. In this manner, the open U-shaped foot support member 238 is able to be pivoted about the axis of member 236 between a generally horizontal foot supporting position and a generally vertical position to facilitate access to the chair.

Figure 11:
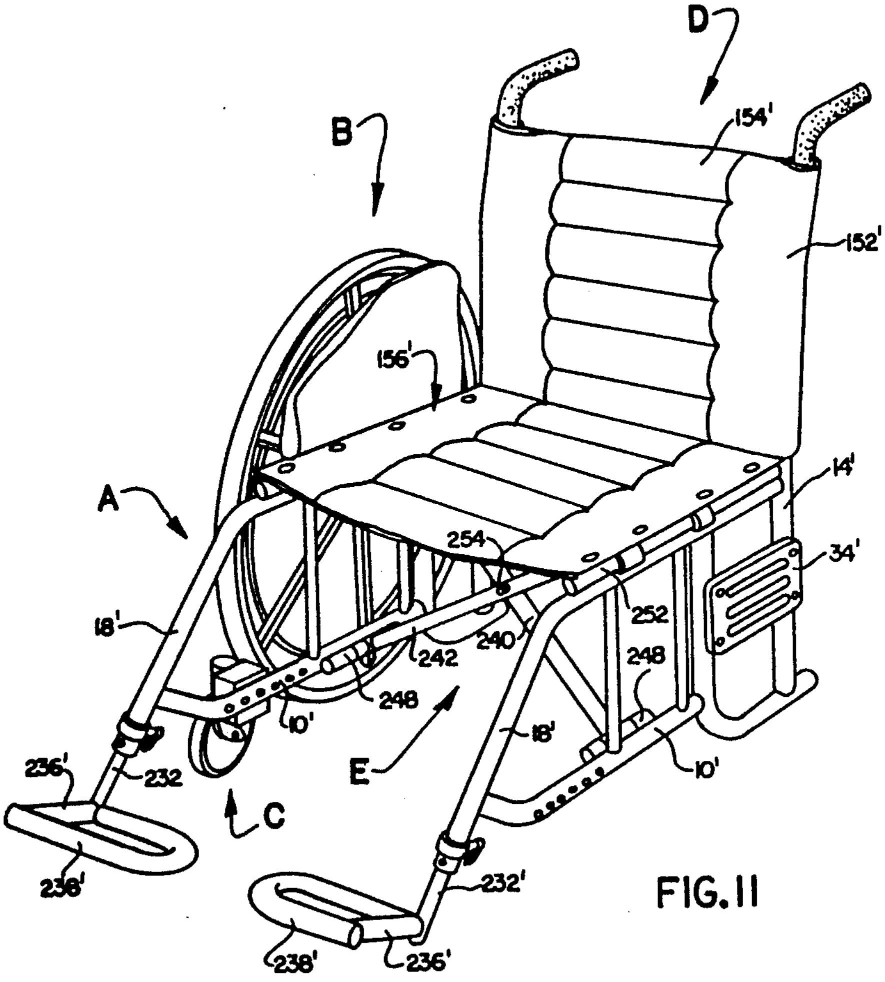
FIG. 11 is a perspective view of an alternate embodiment of the wheelchair of FIG. 1 with left rear wheel removed for simplicity of illustration.
Figure 12:
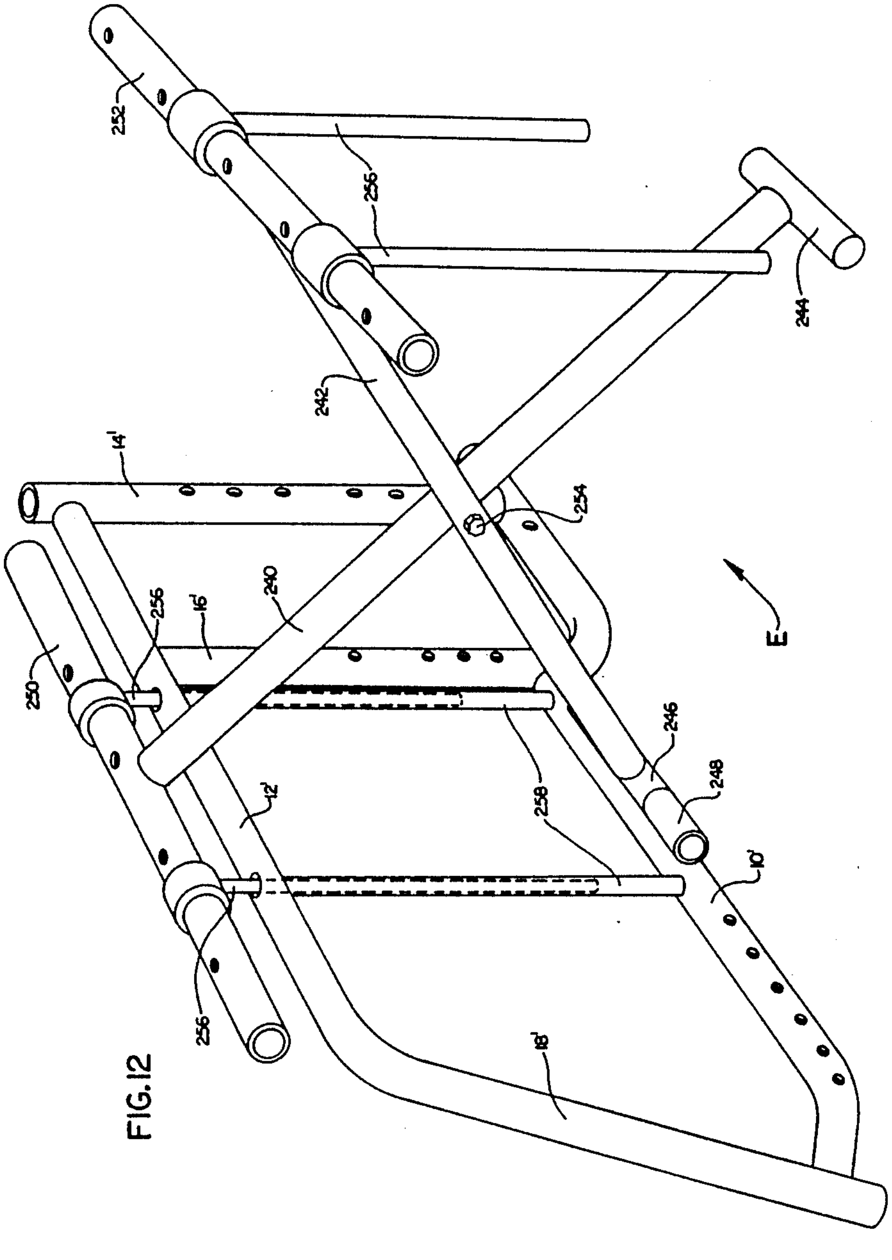
FIG. 12 is an enlarged, exploded view of the folding mechanism of the wheelchair of FIG. 11.

FIGS. 11 and 12 illustrate an alternate embodiment of the wheelchair of FIGS. 1-10. In the embodiment of FIGS. 11 and 12, like elements with the embodiment of FIGS. 1-10 are denoted by the same reference numeral but followed by a prime ('). Because the frame A, rear wheel assembly B, front wheel assembly C, and the operator supporting means D are substantially the same in both embodiments, reference is to be made to the elements of FIGS. 1-9 for the descriptions thereof. The folding mechanism E which is of the cross brace type is described in detail.

The cross brace folding mechanism includes a pair of pivotally connected cross braces 240 and 242. The cross braces have lower transverse segments 244 and 246, respectively, at their lower ends which are pivotally received in bushings 248 connected with the lower horizontal frame portions 10'. At their upper ends, the cross brace members are connected with upper transverse segments 250 and 252, respectively. The cross members are connected centrally by a pivot 154. The lower portion of the seat D is connected directly with the upper cross member segments 244, 246. This enables the lower seat portion to rise above the upper horizontal frame portion 12' as the chair is folded. Guide means such as a plurality of telescopically received tubing pairs 256, 258 are connected rotatably with the upper horizontal cross member segments 244, 246 and with the lower horizontal frame portion 10' such that each upper cross member segment is maintained in the plane of the corresponding frame side portion. The folding mechanism is biased to the unfolded position by the weight of the operator. Accordingly, no locking mechanism is required.

FIGS. 12-20 show another alternate embodiment of the folding sport wheelchair in accordance with the present invention. Like elements in the embodiment of FIGS. 12-20 and the embodiment of FIGS. 1-10 are denoted by the same reference numeral but followed by a double prime ("). The frame portion A has left and right side frame portions of generally the same construction as in the embodiment of FIGS. 1-10, except that the rearmost vertical support member 14 is foreshortened so that the angular orientation of the operator's back support portion of the frame can be adjusted.

Figure 13:
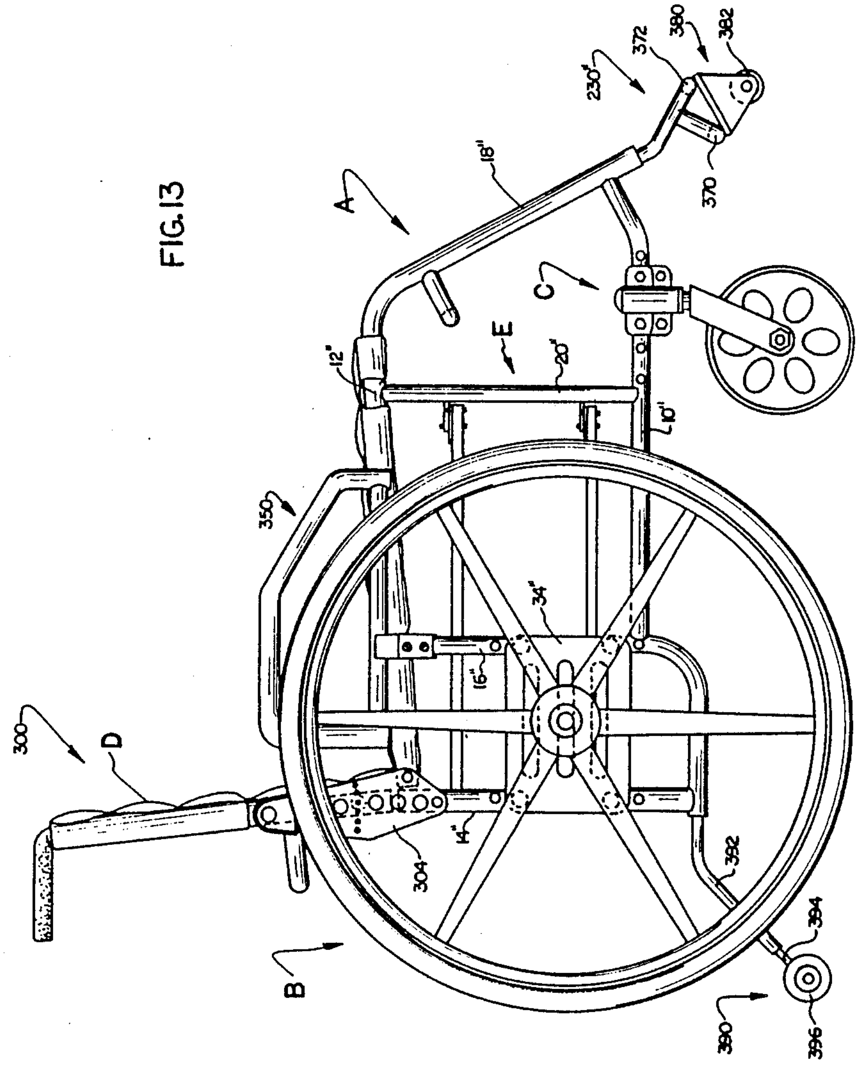
FIG. 13 is a side view of another alternate embodiment of a wheelchair in accordance with the present invention.
Figure 14:
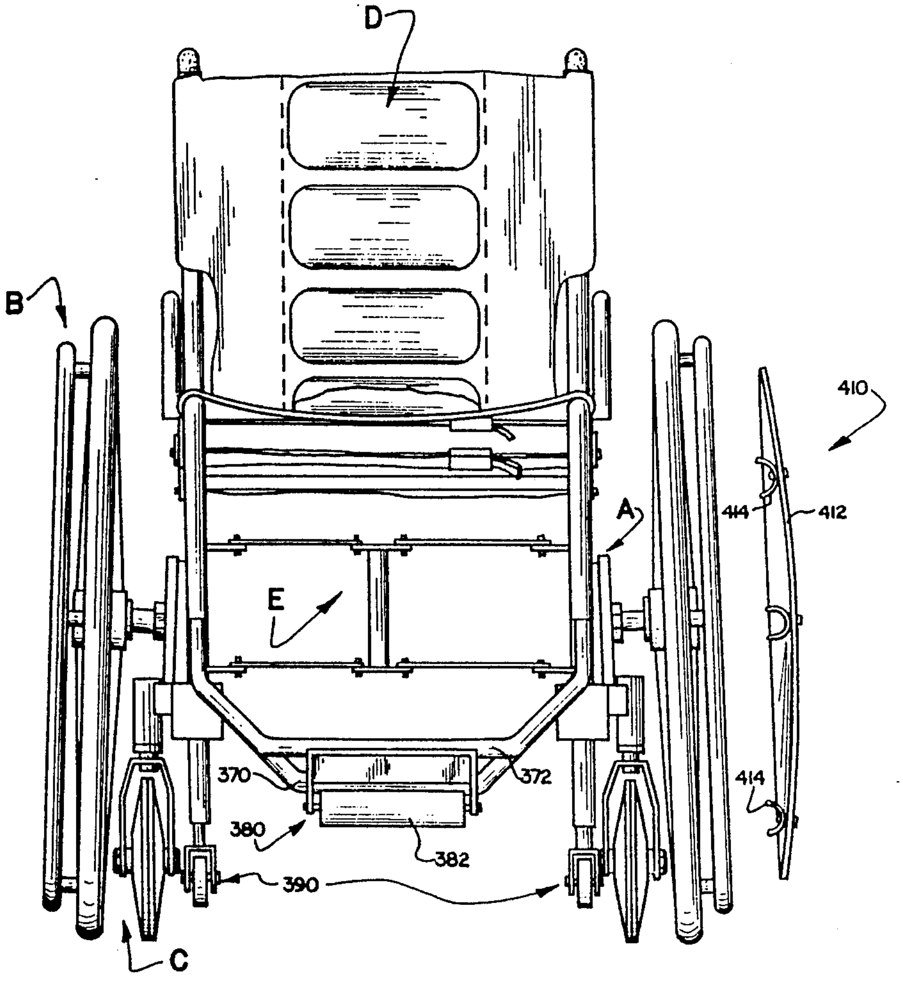
FIG. 14 is a front view of the wheelchair of FIG. 13.
Figure 16:
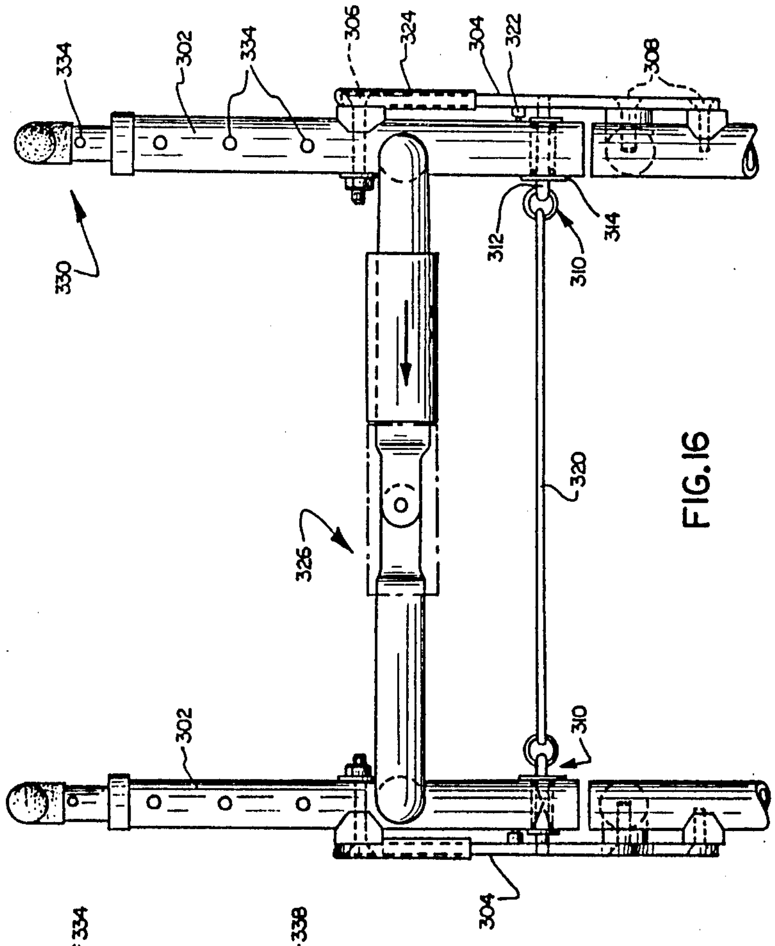
FIG. 16 is a rear view of the back supporting structure of the wheelchair of FIGS. 13 and 14.
Figure 15A:
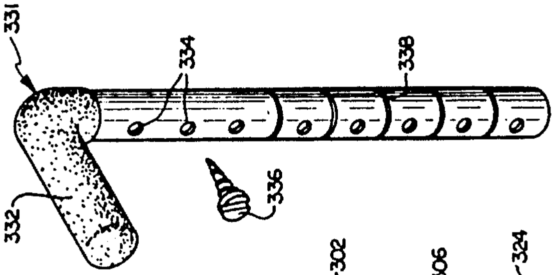
FIG. 15A is a perspective view of one of the rear canes when removed from the wheelchair.
Figure 15:
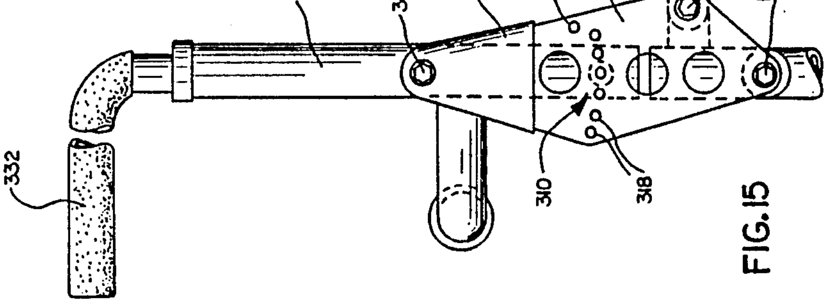
FIG. 15 is an enlarged view in partial section illustrating a back supporting structure and a hinge therefor of the wheelchair of FIGS. 13 and 14.
Figure 17:
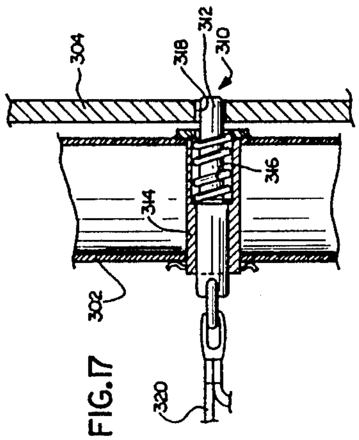
FIG. 17 is an enlarged view of a release assembly of the back supported structure of FIGS. 15 and 16.

With general reference to FIGS. 13 and 14, and particular reference to FIGS. 15, 16 and 17, the frame A includes an operator's back supporting portion 300. A hinge assembly pivotally mounts left and right back supporting frame portions 302 to the left and right main frame side portions. The hinge assembly includes a pair of hinge plates 304 and pivot means 306 for pivotally connecting the back supporting frame portions 302 with the hinge plates. Each hinge plate is connected with the main frame by a suitable connection means such as threaded fasteners 308. The hinge plate to frame back pivot means 306 includes a fastener which passes through an aperture in the hinge plate, a nylon bushing, and into the back supporting frame structure. A selectively releasable locking means 310 selectively locks the back structure and hinge plate in one of a plurality of relative positions, i.e. angular orientations relative to the frame.

With particular reference to FIG. 17, the releasable locking means 310 includes a plunger 312 which is slidably received in a bore or tubular insert 314 extending transversely through the back supporting frame portion. A biasing means, such as a spring 316, biases the plunger toward the hinge plate. The hinge plate defines a plurality of plunger receiving apertures 318 which are arranged a constant, radial distance from the hinge plate to frame back pivot means 306. By retracting the plunger, the back support structure can be pivoted to any one of a plurality of orientations as determined by the hinge plate apertures 318. A flexible cord or cable 320 interconnects the plungers of the locking means 310 on the left and right sides to retract them simultaneously. A stop means 322 limits rearward tipping of the back structure. In the forward direction, the back structure may be folded flat against the frame and seat structure for a lower storage profile. To protect the operator from the edges of the hinge plate, its upper end has a plastic coating 324. A foldable cross member 326 maintains stability of the back support frame portion while enabling it to be folded with the rest of the frame.

With continuing reference to FIGS. 15 and 16 and further reference to FIG. 15A, cane or handle structures 330 are slidably received in generally vertical back supporting frame tubes 302. The canes each have a 90° bend 331 to form a manually graspable handle portion on which a rubber hand grip 332 is mounted. The cane and the vertical back support tube include a plurality of apertures 334 spaced at regular intervals for receiving sheet metal screws 336 to clamp the seat structure to the back structure. The canes have a plurality of score or cut lines 338 at regular intervals therealong to enable the canes to be cut shorter to lower the height of the handles without disrupting the regular spacing between the apertures.

Figure 18:
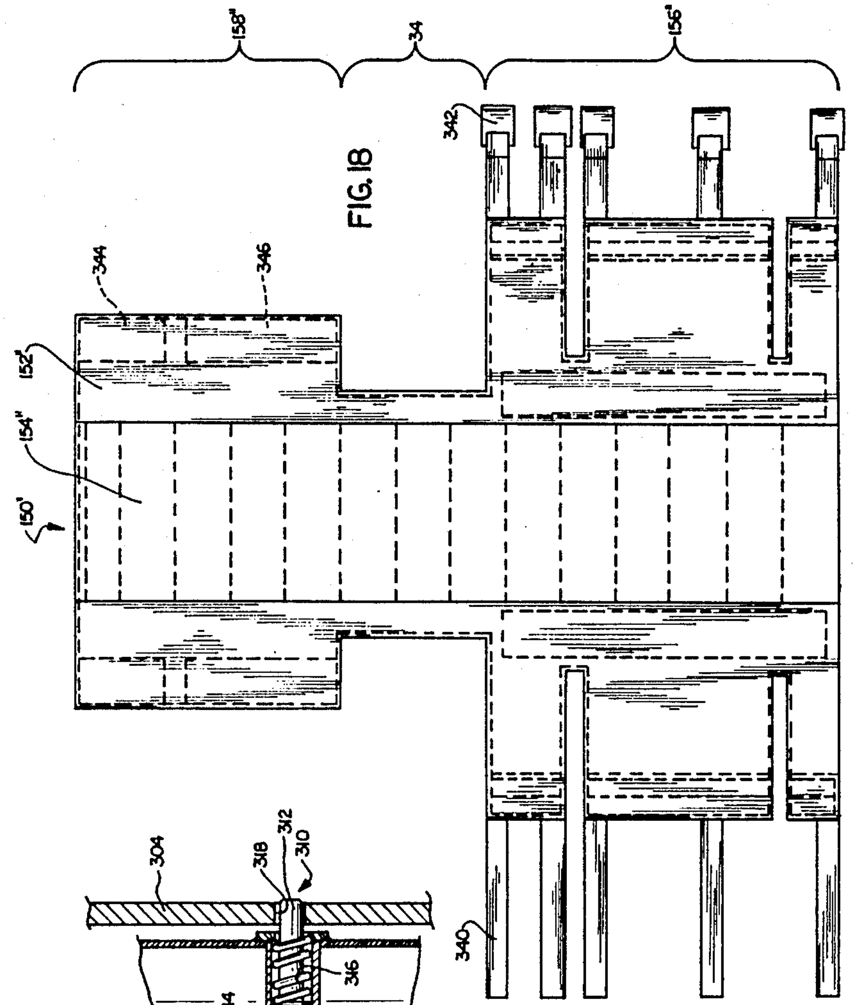
FIG. 18 is a top plan view of the cloth seat detached from the wheelchair of FIGS. 13 and 14.

With continuing reference to FIGS. 13 and 14, and particular reference to FIG. 18, the operator supporting means D includes a flexible cloth seat 150″ including side portions 152″ and a segmented central portion 154″. A front or lower supporting seat portion 156″ wraps around the upper horizontal frame portion 12 and is secured with straps and buckles 340 and 342. A back or upper supporting portion 158″ is folded over between central portion segments to match the selected back height. Hook and loop connecting fabric strips 344 and 346 secure the back portion in the selected folded portion. The back portion is wrapped around the back supporting frame portions 302 and secured with sheet metal screws or the like. A central or intermediate seat portion 348 is connected between the front and rear seat portions but is not directly supported by the frame.

Figure 19:
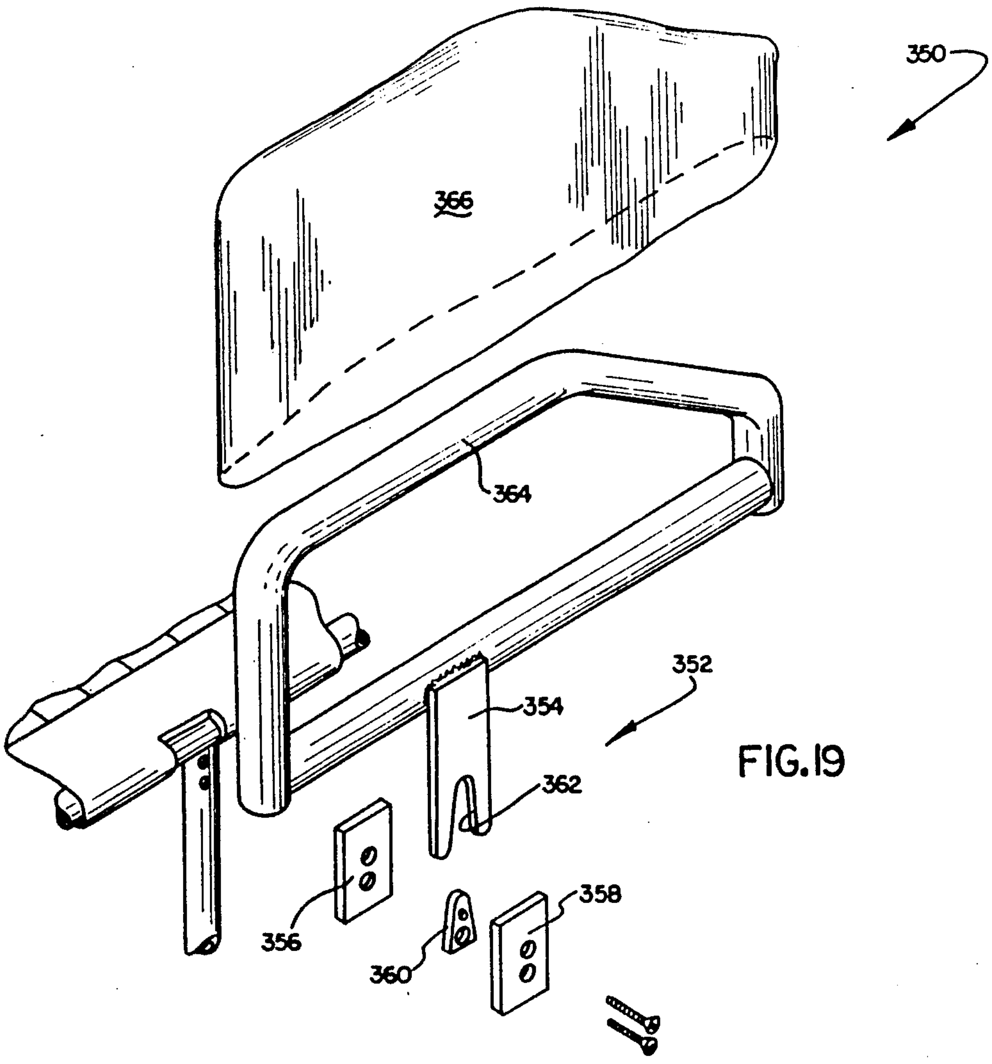
FIG. 19 is an exploded, detailed view of an arm rest/shirt guard from the wheelchair of FIGS. 13 and 14; and, FIG. 20 is a perspective view illustrating a frame folding mechanism of the wheelchair of FIGS. 13 and 14.

With continuing reference to FIGS. 13 and 14, and particular reference to FIG. 19, the operator supporting means D further includes an arm rest/shirt guard assembly 350. A tab and slot slidable connecting structure or means 352 removably mounts the arm rest/shirt guard assembly to the frame. The slot and tab structure includes a fork member 354 projecting from the arm rest/shirt guard structure. The fork member 354 is slidably received in a slot defined between a pair of frame mounted guide plates 356 and 358. An intermediate spacer plate or member 360 maintains the spacing of the slot. The spacer member 360 is received in a slot 362 in the fork member 354. In this manner, a double slot and tab is defined. The spacer plate 360 and fork slot 362 prevents forward and aft movement and fork member 354 and the slot between the guide plates 356, 358 prevents side to side movement. The guide plates are mounted on the frame behind the rear wheel such that they are relatively inaccessible to contact with the operator's hands.

An arm rest structure 364 includes a generally horizontal extending portion disposed above the top of the rear wheels to protect the operator from the wheels. A shirt guard cloth pocket 366 is dimensioned for frictional engagement over the arm rest structure 364. This provides a solid wall to prevent articles of the operator's clothing from passing through the arm rest structure and engaging the rear wheels.

With reference to FIGS. 13 and 14, a foot rest assembly or means 230″ is adjustably connected with the frame such that a pair of generally horizontal foot supporting bars 370, 372 are positionable an adjustable distance from the lower seat portion 156″. One of the horizontal foot bars 370 is disposed substantially in alignment with the front frame portion 18″ and the other foot bar 372 is disposed offset a fixed distance therefrom. The foot supporting means is insertable within the frame with the offset bar 372 disposed either forward or rearward of the aligned bar 370. This provides operator flexibility in the positioning of the foot rest means.

With continuing reference to FIGS. 13 and 14, a forward anti-tip assembly 380 is connected with threaded fasteners to the horizontal foot supporting bars 370, 372 of the footrest assembly 230″. The forward anti-tip assembly includes a pair of side brackets between which an extruded plastic, partially hollowed roller 382 is rotatably mounted. A rear anti-tip means 390 is selectively mounted to a rear portion of the frame. The rear anti-tip means includes a pair of angled metal tubes 392 in which a pair of extension tubes 394 are telescopically and adjustably received. A pair of rollers 396 are rotatably mounted on the end of each extension tube.

Figure 20:
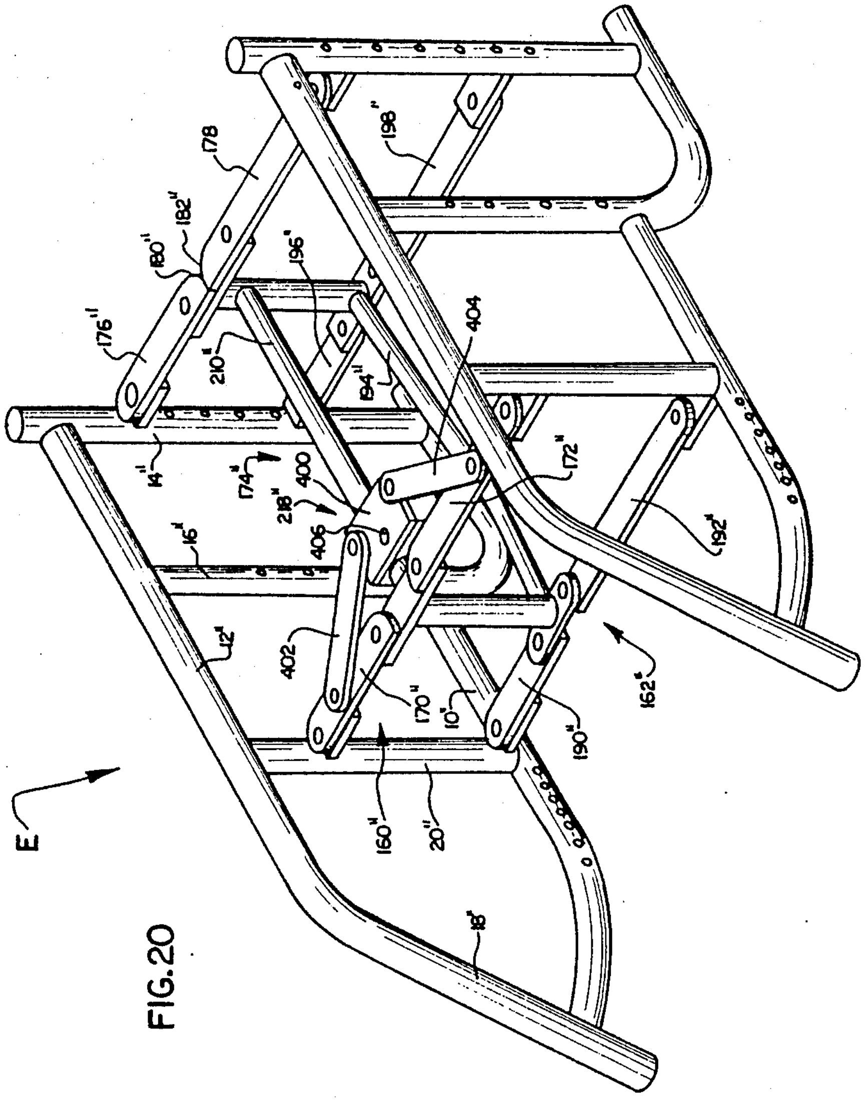

With continuing reference to FIGS. 13 and 14, and particular reference to FIG. 20, the folding mechanism E includes a main frame folding means which selectively enables left and right frame side positions to be moved into a close parallel relationship. The folding mechanism includes an upper folding portion 160″ and a lower folding portions 162″.

The upper folding portion 160″ includes an upper, forward pair of equal length pivotal spacer members 170″ and 172″ which are pivotally connected at their outer ends with the left and right side frame portions and pivotally connected at their inner end with an upper pivotal connection assembly or means 174″. A pair of upper, rear spacer members 176″ and 178″ are pivotally connected at their outer ends with the left and right frame portions and pivotally connected at their inner ends with the upper pivotal connection means 174″. The upper front and rear spacer members pivot from the generally parallel position of FIG. 20 forward, drawing the left and right frame side portions together. A pair of selectively mating stop surfaces 180″ and 182″ on the rear, upper spacer members limit rearward pivoting of the upper, rear spacer members to a couple of degrees beyond 180°.

The lower folding mechanism 162″ includes a pair of lower, forward spacer members 190″ and 192″ which are pivotally connected at their outer ends with the left and right side frame portions and pivotally connected at their inner ends with a lower pivotal connection assembly or means 194″. A pair of lower, rear spacer members 196″ and 198″ are pivotally connected at their outer ends with the frame side portions and at their inner ends with the lower pivot means 194″. The lower, rear spacer members may also have locking surfaces analogous to locking surfaces 180″ and 182″.

The upper pivot means 174″ includes a coordinating means 218″ for coordinating the folding movement of the spacer members to the left and right sides thereof such that the chair folds symetrically. In the embodiment of FIG. 20, the coordinating means includes a slide member 400 which is slidably mounted on a shaft 210″ for forward and rearward movement and a pair of coordinating links 402 and 404 pivotally connected between the slide member and the upper, forward spacer members. In this manner, the coordinating means 218″ causes the upper, front spacer members 170″ and 172″ to undergo the same degree of angular movement relative to the shaft 210″. A locking pin is selectively received in an aperture 406 in the slide 400 and an aligned aperture (not shown) in shaft 210″ to lock the slide against movement, hence prevent the folding mechanism from drawing the left and right side frame portions together.

With particular reference to FIG. 14, a shield 410 is provided for inhibiting objects, such as fingers, from engaging spokes of the rear wheels. The shield includes an annular disc 412 which is mounted to the spokes by a plurality of hook and loop connection fabric strips 414. Each of the strips has a hook fabric portion or face and a loop fabric portion or face. Each strip pair wraps around one or more spokes and interconnects to hold the shield in place.

The invention has been described with reference to the preferred embodiment. Obviously, modifications and alterations will occur to others upon reading and understanding the preceding detailed description of the preferred embodiments. It is intended that the invention be construed as including all such alterations and modification insofar as they come within the scope of the appended claims or the equivalents thereof.

Having thus described a preferred embodiment, the invention is now claimed to be:

1. A wheelchair comprising:

a frame assembly including a lower frame portion and a back frame portion, the lower frame portion and back frame portion joined by an associated connecting structure, the back frame portion including two generally vertical tubular members, each generally vertical tubular member defining at least one mechanical fastener receiving aperture therein;

an operator supporting means including a lower supporting portion operatively connected with the lower frame portion for supporting the operator and a back supporting portion operatively connected between the tubular members for supporting the operator's back;

a pair of rear wheel mounting assemblies for selectively mounting a pair of rear wheels to the frame assembly;

a pair of front wheel mounting assemblies for selectively mounting a pair of front wheels to the lower frame portion; and, a pair of L-shaped rear canes, each cane including:

a first portion defining a hand grip and a second portion extending generally perpendicular to the first portion, the second cane portion defining a plurality of alternating apertures and score lines, the apertures being spaced at preselected regular intervals from each other, the score lines being spaced at said preselected intervals from each other to facilitate shortening the cane second portion by multiples of said preselected interval, the cane second portion being disposed in telescopic receipt with one of the generally vertical tubular members with one of the cane second portion apertures aligned with one of the generally vertical tubular member apertures, mechanical interconnection means between the associated connecting structures and the rear tubular members for limiting the telescopic receipt between the cane telescopic receipt portions and the rear tubular members, such that severing the cane telescopic receipt portions at corresponding ones of the score lines shortens the telescopic receipt portions and enables the hand grips to be positioned lower without interference from the associated connecting structures; and, a fastener extending through the aligned cane second portion and generally vertical tubular member apertures to fix the cane to the frame with the hand grip portion at one of a plurality of preselected heights.

2. The wheelchair as set forth in claim 1 wherein the plurality of cane second portion apertures is disposed in alignment with the hand grip portion such that when the canes are mounted in the tubular members with the hand grip portions extending rearward of the chair, the apertures face rearward of the chair.

3. The wheelchair as set forth in claim 1 further including a rubber coating on the hand grip portions of the cane.

4. The wheelchair as set forth in claim 1 wherein the lower frame portion further includes a folding mechanism which selectively permits left and right side frame portions to be moved together into a folded position and apart into a normal operating position and further including a foldable cross member operatively connected between the generally vertical members such that the generally vertical members may be selectively moved together into a folded position.

5. A wheelchair comprising:

a lower frame portion;

a pair of rear tubular members, each tubular member having at least one aperture therein;

a pair of hinges, each hinge interconnecting one of the rear tubular members with the lower frame portion, the hinges selectively moving the rear tubular members at least between a generally horizontal position adjacent the lower frame portion and a generally vertical position extending upward from the lower frame portion;

an operator supporting means including a lower supporting portion operatively connected with the lower frame portion for supporting the operator and a back supporting portion operatively connected between the rear tubular members for supporting the operator's back;

a pair of rear wheel mounting assemblies for selectively mounting a pair of rear wheels to the lower frame portion;

a pair of front wheel mounting assemblies for selectively mounting a pair of front wheels to the lower frame portion;

a pair of rear canes, each cane including:

a hand grip portion, a telescopic receipt portion operatively connected with the hand grip portion, the telescopic receipt portion defining a plurality of apertures and score lines, the apertures being spaced at preselected regular interval from each other, the score lines being spaced at said preselected interval from each other to facilitate shortening of the second cane portion by multiples of said preselected interval, the cane telescopic receipt portion being disposed in telescopic receipt with one of the rear tubular members with one of the cane telescopic receipt portion apertures aligned with one of the rear tubular member apertures, mechanical interconnections between the hinges and the rear tubular members limiting the telescopic receipt between the cane telescopic receipt portions and the rear tubular members, such that severing the cane telescopic receipt portions at corresponding ones of the score lines shortens the telescopic receipt portions and enables the hand grips to be positioned lower without interference from the hinges; and, mechanical members extending through the aligned cane receipt portion and the rear tubular member apertures to fix the canes to the rear tubular members at one of a plurality of preselected heights.

6. The wheelchair as set forth in claim 5 wherein each hinge has an array of apertures therein and a spring biased plunger is mounted in each of the tubular members for selectively engaging one of the apertures of the array of each hinge.

7. The wheelchair as set forth in claim 6 wherein the hinges are each mounted on outer sides of the tubular members, the plungers extend through the generally vertical tubular members to engage the adjacent hinge and wherein the plungers are spring biased outward.

8. The wheelchair as set forth in claim 6 further including a flexible cord which interconnects the plungers for selectively retracting both plungers simultaneously against the respective spring bias to enable the angle of the generally vertical tubular members to be adjusted.

* * * * *